May 12, 1953
C. G. SONTHEIMER
2,638,000
BRIDGE-TYPE CAPACITANCE LIQUID LEVEL GAUGE
Filed Jan. 14, 1950
4 Sheets-Sheet 1
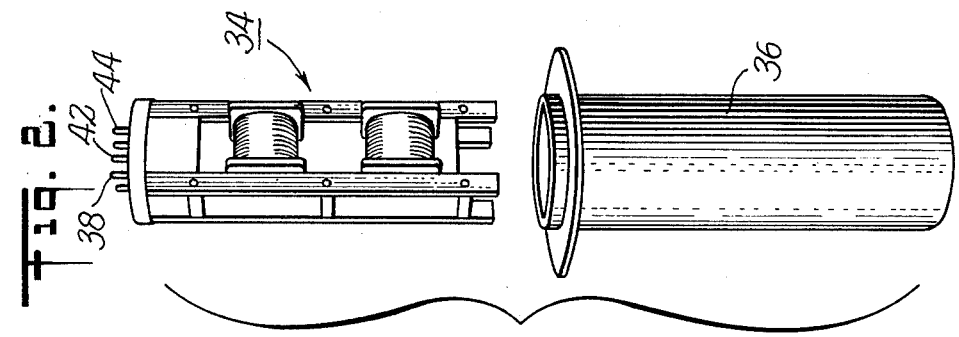
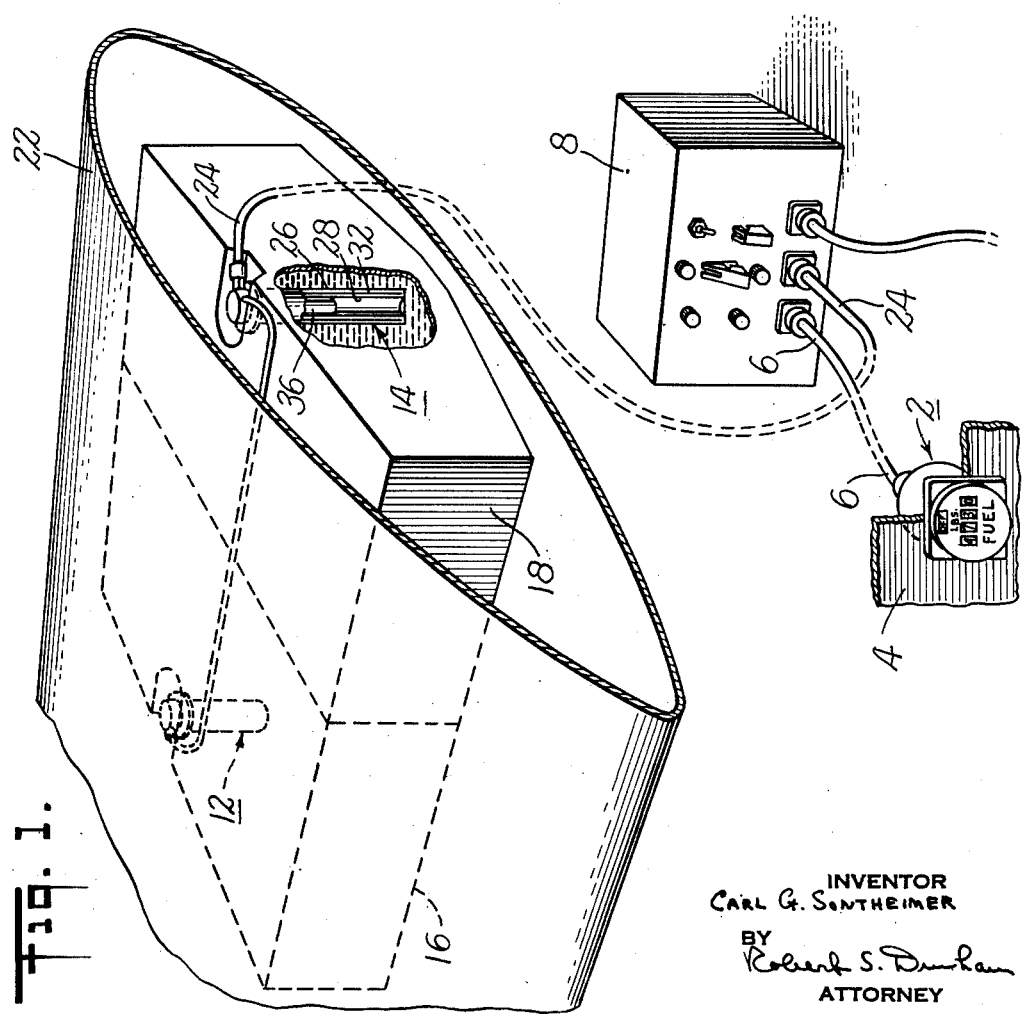
INVENTOR
CARL G. SONTHEIMER
BY
Robert S. Dunham
ATTORNEY INVENTOR
CARL G. SONTHEIMER
BY
Robert S. Dunham
ATTORNEY May 12, 1953 — C. G. SONTHEIMER — 2,638,000
BRIDGE-TYPE CAPACITANCE LIQUID LEVEL GAUGE
Filed Jan. 14, 1950 — 4 Sheets-Sheet 3

INVENTOR
CARL G. SONTHEIMER
BY Robert S. Dunham
ATTORNEY

May 12, 1953  C. G. SONTHEIMER  2,638,000
BRIDGE-TYPE CAPACITANCE LIQUID LEVEL GAUGE
Filed Jan. 14, 1950  4 Sheets-Sheet 4
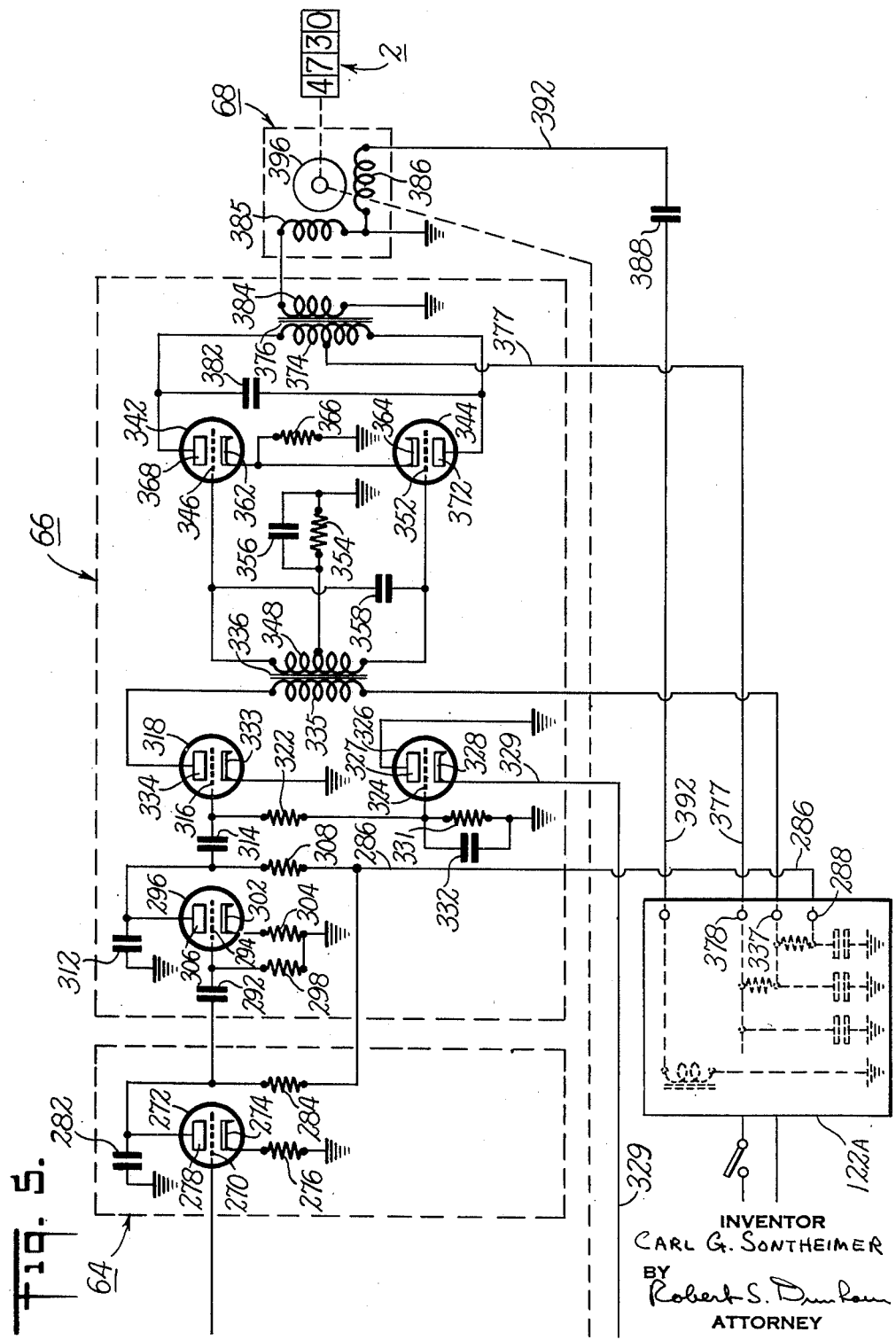
INVENTOR
CARL G. SONTHEIMER
BY
Robert S. Dunham
ATTORNEY Patented May 12, 1953

2,638,000

UNITED STATES PATENT OFFICE 2,638,000

BRIDGE-TYPE CAPACITANCE LIQUID LEVEL GAUGE

Carl G. Sontheimer, Riverside, Conn., assignor to The Liquidometer Corporation, Long Island City, N. Y., a corporation of Delaware Application January 14, 1950, Serial No. 138,611

21 Claims. (Cl. 73—304)

This invention is in the field of industrial measurements, and is described particularly as embodied in a gauge for indicating, on a remotely-positioned indicator, the quantity of liquid in one or more fuel-tanks.

In aircraft it is important that the operating personnel be able at all times to ascertain the amount of fuel in the tanks. This is important not only when loading fuel on the aircraft, but also in flight. Particularly under emergency conditions, it is essential that the amount of remaining fuel be known exactly so that flight plans can be made accordingly.

The depth of the fluid in a fuel-tank can be measured by determining the capacity of a condenser, which comprises two spaced conductors, for example, plates or concentric cylinders, positioned vertically in the tank. The capacity of such a condenser depends upon the characteristics of the material between the plates. Thus, the capacity of a given condenser with gasoline filling all of the space between the plates is approximately twice that which it would have if the gasoline were replaced by air. This change in capacitance occurs because the dielectric constant of gasoline is different from that of air, gasoline having a dielectric constant of about two and air having a dielectric constant of unity. The condenser will have proportionate intermediate capacitance values when the space between the condenser plates is only partly filled with gasoline.

Under laboratory conditions, the accurate measurement of the capacity of such a condenser is not difficult, but when it is attempted to use such measurements as the basis for routine field determinations, many difficult problems must be solved. For example, the commercial embodiment must be reliable and accurate under a wide variety of operating conditions and must be sufficiently rugged to withstand the rough handling to be expected in normal field use. Moreover, supply voltages, temperature and other ambient conditions may vary over wide ranges; and such changes must not interfere with the accuracy of the instrument.

Fuel gauges used in aircraft are subject to continual vibration, wide variations in temperature and supply voltage; and, in addition, it is not feasible to position a large amount of auxiliary apparatus immediately adjacent to the fuel tank which contains the measuring condenser. Thus, relatively long connecting cables may be required; and the capacity between these cables and ground, that is, the metallic portions of the aircraft, may be large in comparison with the capacity of the measuring condenser. Changes in this cable capacity, caused by changes in temperature, humidity, shifting of the cables, etc., must not cause excessive errors in the indicator readings.

Moreover, in aircraft, the fuel tanks must be dimensioned to fit into the available spaces, so that the tanks of different cross-sectional areas and depths are often carried by a single aircraft. Because the pilot does not have sufficient time to perform any unnecessary computations, it is important that a single gauge be provided which is capable of indicating the total amount of fuel in all of these tanks.

In accordance with the present invention, an accurate and reliable system is provided for measuring the capacity of one or more remotely-positioned condensers, and is described particularly in the form of a gasoline gauge for use on aircraft. In one embodiment, which will be described in detail later, the capacity of the measuring condenser is determined by means of a normally-unbalanced bridge circuit which is positioned adjacent to the condenser at the fuel tank, so that all components of the bridge circuit are subject to the same ambient conditions as the measuring condenser. Relatively high frequency current is used to energize the bridge circuit to permit the use of small light-weight impedance-transformers, so that low impedance cables can be employed to connect the bridge circuit to the auxiliary electronic apparatus, resulting in minimum disturbance of the accuracy such as might be caused by stray voltages introduced into the relatively long connecting cables or by variations in the shunt capacities of the connecting cables. The unbalance voltage from the bridge circuit is measured by comparing it with a separate voltage from the same source, a low-frequency commutator circuit being provided to minimize errors which might be caused by variations in the phase shift produced by the electrical circuits. The amount of fuel in the tanks is denoted by a mechanical counter operated by an electric motor, thus providing accurate and easily readable indications. An arrangement is provided for indicating the total amount of fuel in two or more fuel tanks of different sizes.

Accordingly, one aspect of the present invention is directed to the elimination of variations in the indications such as might be caused by changes in the shunt capacity of the cable connecting the measuring condenser and bridge circuit with the auxiliary apparatus. Another aspect of the invention is directed to a measuring system in which relatively high frequency current is used in the capacitance measurement with relatively low impedance connecting lines between the condenser and the auxiliary apparatus. Another aspect is directed to such a system wherein a capacity being measured is incorporated in a compact bridge circuit positioned adjacent to the condition-responsive condenser. Still another aspect is directed to such a system including circuit means for comparing the unbalance voltage of the bridge circuit with a rebalanceing voltage and to the minimizing of errors such as might be caused by phase difference in the comparison signals. Another aspect of the invention relates to such a system wherein a counter-type indicating mechanism provides a large number of scale divisions permitting precise determination of the indicated values. Still another aspect of the invention is directed to such a system wherein the unbalance voltages from separate bridges positioned near respective fuel tanks are added together and measured by a single measuring apparatus to indicate the total amount of fuel in all of the tanks.

These and other aspects, objects, and advantages of the present invention, the scope of which is set forth in the appended claims, will be in part pointed out in the following description and in part apparent therefrom when considered in conjunction with the accompanying drawings, in which similar numbers refer to similar parts throughout the several views:

Figure 1 shows, diagrammatically, two aircraft fuel-tanks, each of which is provided with a measuring condenser, and apparatus embodying the present invention for indicating the total amount of fuel in the two tanks;

Figure 2 shows apparatus providing a bridge circuit which is mounted within one of the measuring condensers shown in Figure 1;

Figure 3:
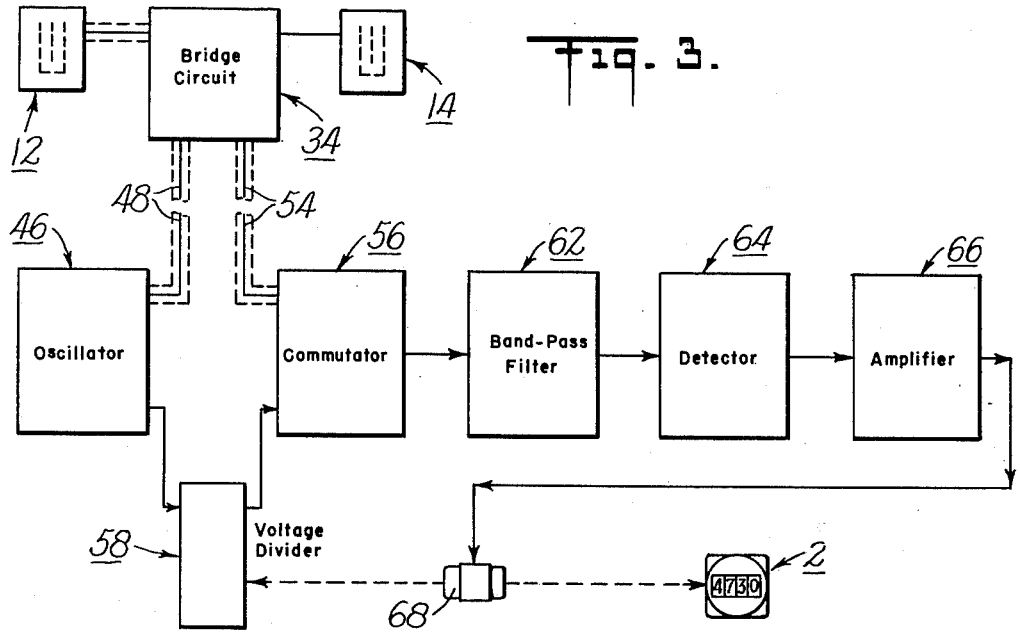
Figure 3 is a block diagram of the electrical apparatus of Figure 1.
Figure 6:
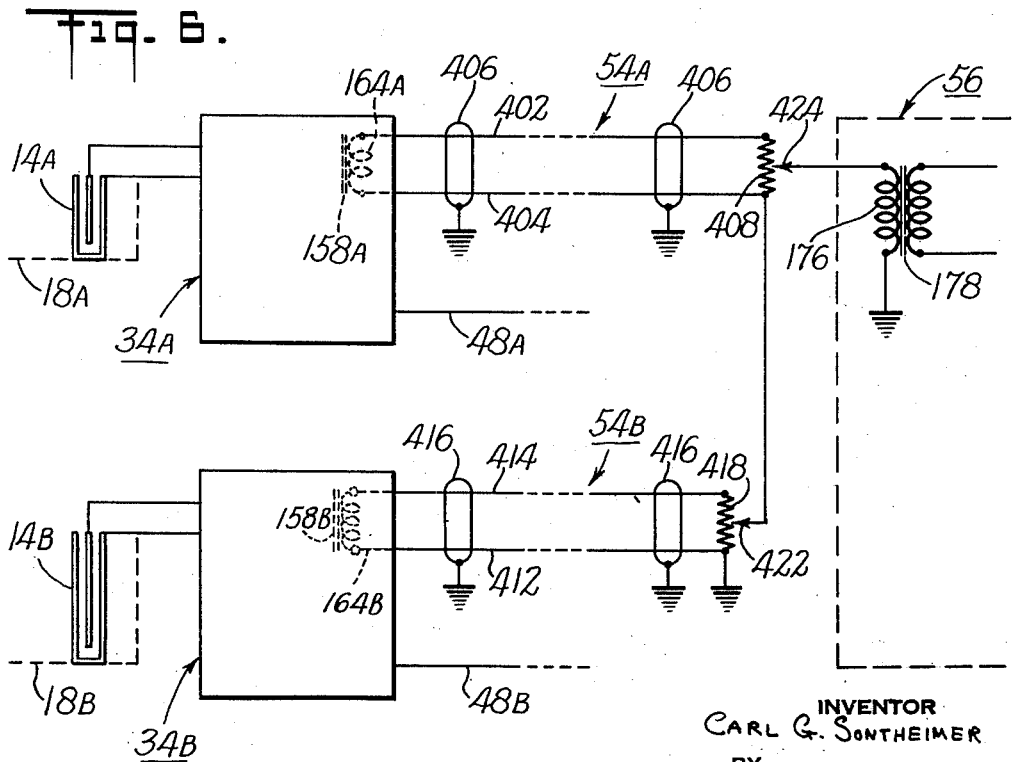
Figure 4:
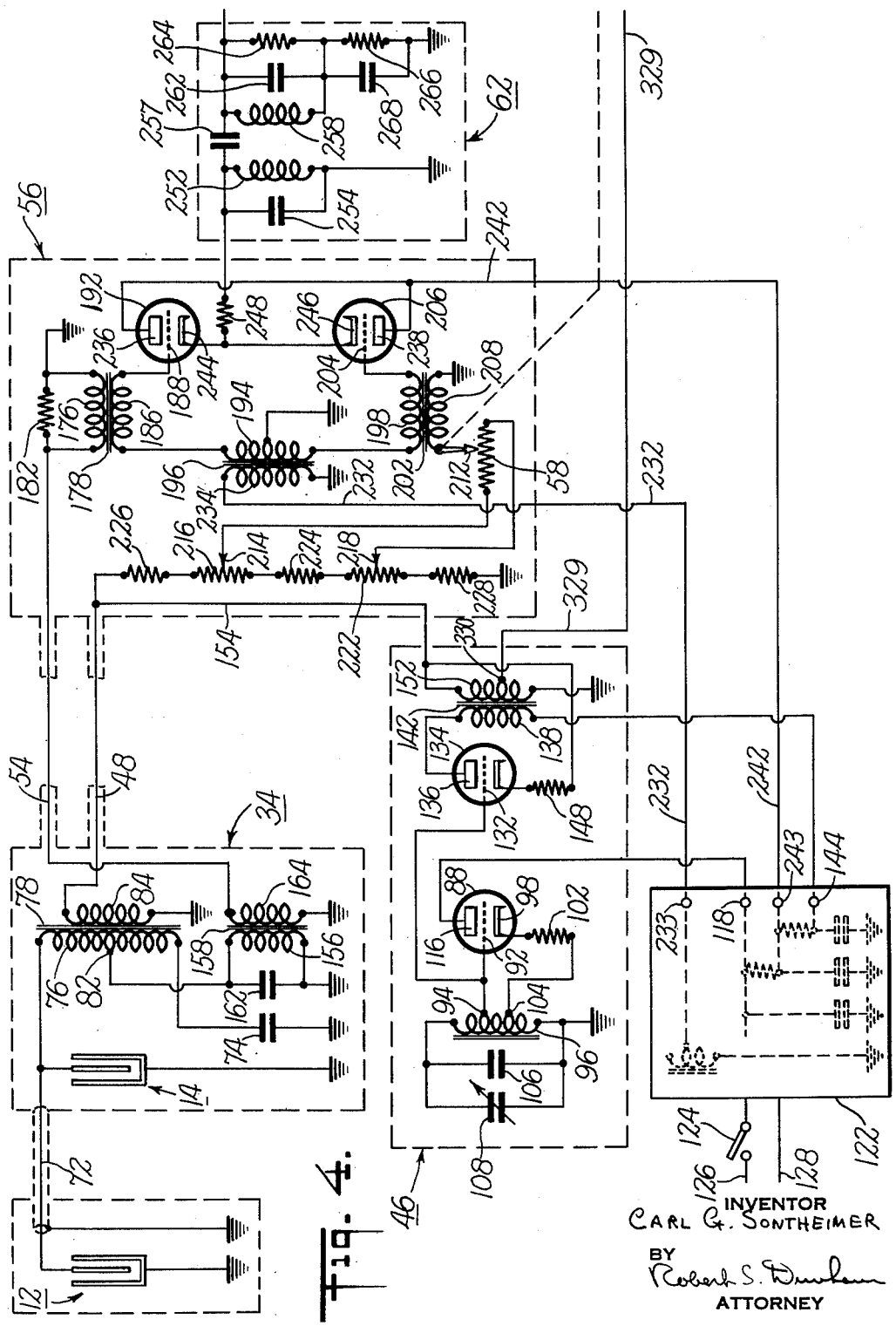

Figures 4 and 5 together provide a schematic representation of the electronic circuits of the apparatus of Figure 3; and Figure 6 shows, diagrammatically, a modification of the measuring system adapted to measure the total quantity of fuel in two widely separated tanks.

In the aircraft fuel-gauge system shown in Figure 1, a counter-type indicator, generally indicated at 2, is supported on an instrument panel 4, and ordinarily is positioned so as to be readily visible to the pilot of the aircraft. This indicator 2 is connected by a cable 6 to a control-box 8, which houses electronic equipment for actuating the indicator in accordance with the total capacity of two fuel-tank condensers, generally indicated at 12 and 14, which are positioned vertically in two fuel-tank compartments 16 and 18, respectively. As indicated diagrammatically in the drawing, these fuel-tank compartments are mounted within a wing 22 and the tank condensers 12 and 14 are coupled to the electronic apparatus by a cable 24.

Each of these tank condensers is constructed in the form of an outer metal cylinder 26 which is positioned concentrically around an inner metal cylinder 28. Both of these cylinders are grounded and form one plate of the measuring condenser. The other plate of the condenser is formed by an intermediate cylinder 32 of metal positioned concentrically between the inner and outer cylinders and insulated therefrom.

The outer cylinder 26 is provided with suitable openings (not shown) so that, when the condenser is positioned vertically in the fuel-tank, the fuel will fill the spaces between the three cylinders to a height corresponding with the level of the fuel in the tank. The capacity of the measuring condenser then will be a function of the proportion of the space between the cylinders which is filled with fuel, and in turn of the level of the fuel in the tank. The two tank condensers are arranged so that their respective capacities effectively are added together so that the indicator 2 will denote the total amount of fuel in both tank compartments 16 and 18.

In order to avoid errors which would be caused by variations in ambient conditions, such as temperature, and for other reasons which will be made apparent later, a bridge circuit, generally indicated at 34 (see also Figure 2) desirably is positioned near condenser 14. In this embodiment the bridge circuit is mounted within a closed cylindrical tube 36, which is positioned within the inner condenser cylinder 28. Suitable terminals, as at 38, 42, and 44, are provided for making electrical connections to the bridge circuit.

The general method of operation can be understood by consideration of Figure 3, which shows in block form the arrangement of the major electrical units. An oscillator 46 generates a constant frequency signal, for example, ten kilocycles, which is coupled by a shielded transmission line 48 to the bridge circuit 34 of which the tank condensers 12 and 14 form one arm.

Because the condensers 12 and 14 and the bridge circuit 34 must be positioned at the tank where the fuel level is to be measured, the transmission line or cable 48 in some instances must be relatively long and there may be sizable variations in the capacity between this cable and ground. In order to avoid errors which would be caused by changes in this capacity, or by voltages induced in the cable from stray fields, a low impedance cable is preferably employed. This construction is feasible because the relatively high frequency of the signal from oscillator 46 permits the use of small light-weight transformers at each end of the cable 48.

The bridge circuit 34 is constructed so that under normal conditions of use it is unbalanced. The extent of unbalance of the bridge depends upon the capacity of tank condenser 14 (together with condenser 12 and any other condensers connected in parallel with it); this unbalance signal is delivered by bridge circuit 34 to a second low impedance cable 54, the magnitude of this signal being a measure of the quantity of fuel in the tanks.

The cable 54 is coupled to a commutator 56, where the unbalance signal from the bridge circuit 34 is compared with another signal taken from the oscillator 46. In order to obtain the latter signal, the oscillator 46 is coupled to a variable voltage-divider circuit, which for example may include a motor-driven potentiometer 58. This potentiometer delivers to the commutator 56 a signal voltage, the magnitude of which depends upon the positioning of the potentiometer 58. This voltage is adjusted automatically to be equal in magnitude to the unbalance signal from the bridge circuit 34, so that the indicator 2, which is operated in unison with the potentiometer 58, will indicate the amount of fuel in the tank.

In order to minimize difficulty of comparing the magnitude of the signal from the bridge 34 directly with that from the potentiometer 58, because of the phase shifts introduced in the bridge and connecting circuits, the commutator 56 is provided, this commutator operating as hereinafter set forth at a frequency relatively low compared to the frequency of the signal delivered by the oscillator 46. In aircraft installations it is convenient to use the 400-cycle source to control the commutation.

This commutator 56 alternately delivers the unbalance signal of bridge 34 and the comparison signal of potentiometer 58 to a band-pass filter 62, which removes the 400-cycle commutation voltage. The signal from filter 62 is passed through a detector circuit 64 and an amplifier 66.

The commutation and detector circuits are arranged so that, for periods of time corresponding to alternate half-cycles of the 400-cycle commutating voltage, the output signal will have an amplitude dependent upon the extent of bridge unbalance and, for the periods of time corresponding to the intervening half-cycles of the 400-cycle voltage, will have an amplitude dependent upon the setting of potentiometer 58. Thus, if the system is in balance there will be no varying low-frequency component in the output signal, but if it is unbalanced, a signal in-phase or 180° out-of-phase with respect to the 400-cycle voltage will be produced depending upon whether the voltage from potentiometer 58 is larger or smaller than the unbalance voltage of bridge 34.

This unbalance signal from amplifier 66 is applied to a conventional two-phase reversible motor 68, also energized by current from the 400-cycle source that has been shifted in phase, so that the motor 68 runs in forward or reverse direction depending upon the phase of the signal from the amplifier 66.

The motor 68 is coupled mechanically to the potentiometer 58 and adjusts the potentiometer in such direction as to maintain equality between the voltages delivered by the potentiometer 58 and the bridge circuit 34.

The motor 68 is connected also to the counter-type indicator 2 which is controlled in accordance with the setting of potentiometer 58 and, thus, can be calibrated directly in terms of the quantity of fuel in the tank or tanks being measured.

In practice, more than one condenser can be connected in parallel in order to measure the total amount of fuel in more than one tank, provided the tanks are sufficiently close together that relatively short connecting cables can be used which have such constant shunt capacities that excessive error is not introduced.

Figures 4 and 5 when taken together show the circuit details of the block diagram of Figure 3. In this embodiment, the two tank condensers 12 and 14 are connected together by a short length of coaxial cable 72 which, for example, has a shunt capacity of 100 micro-microfarads, this capacity remaining substantially constant because of the coaxial construction of the cable and because of its relatively short length.

These two condensers 12 and 14, in parallel, form one arm of the alternating current bridge 34. The adjacent bridge arm, against which the capacity of the measuring condensers is balanced, is formed by a fixed condenser 74, which may be provided with one or more trimmer condensers (not shown) for adjustment purposes. The other two arms of the bridge 34 are formed by the two halves of the secondary winding 76 of a transformer 78. The unbalanced voltage of this bridge circuit appears between the center tap 82 of winding 76 and ground.

In order to energize this bridge circuit, the primary winding 84 of the transformer 78 is connected by means of the cable 48, which may be of considerable length, to a Hartley-type oscillator and amplifier circuit 46.

The oscillator 46, which generates a relatively high frequency signal, as described in connection with Figure 3, comprises a triode vacuum tube 88, the control grid 92 of which is connected to a tap 94 of an inductance 96. The cathode 98 of the tube 88 is connected through a bias resistor 102 to a tap 104 on the inductance 96. A condenser 106 is connected in parallel with the inductance 96 to form the tuned circuit of the oscillator. To permit adjustment of the frequency generated by oscillator 46, a variable condenser 108 is connected in parallel with the condenser 106. One end of the parallel resonant circuit, formed by inductance 96 and condensers 106 and 108, is connected to the common ground circuit, thus providing a return circuit for the control grid 92. The anode 116 of this tube 88 is connected directly to a positive voltage terminal 118 of a conventional power supply 122, which is connected through a switch 124 to alternating current supply lines 126 and 128.

In order to amplify and stabilize the oscillator signal, the signal from oscillator tube 88 is coupled from grid 92 of this tube to the control grid 132 of an amplifier tube 134. The anode 136 of this amplifier tube is coupled through the primary winding 138 of an output transformer 142 to a positive voltage supply terminal 144 of the power supply 122, and its cathode is connected through a bias resistor 148 and the secondary winding 152 of the transformer 142 to ground. By means of this transformer coupling between the plate and cathode, a degenerative signal is introduced into the cathode circuit to provide negative feedback and avoid distortion of the amplified wave form. The amplified signal is coupled from the secondary winding 152 through a lead 154 to the cable 48 by which the signal is transmitted to the remotely-positioned bridge circuit 34.

The unbalanced voltage from bridge circuit 34, appearing between the center tap 82 of transformer winding 76 and ground, is transmitted to the commutator circuit 56 by the cable 54. The center tap 82 of winding 76 is connected through the primary winding 156 of a transformer 158 to ground. This winding 156 is connected in parallel with a condenser 162, which is provided for the purpose of tuning the winding 156 to a frequency approximating that of the signal delivered by the bridge circuit 34. One end of the secondary winding 164 of this transformer is connected to ground, and the opposite end is connected to the inner conductor of the connecting cable 54.

In the commutator circuit, the opposite end of cable 54 is connected to one end of the primary winding 176 of a transformer 178, and the opposite end of this winding 176 is connected to the common ground circuit. A resistor 182 is connected in parallel with the winding 176, so that the line impedance may be set sufficiently low to minimize the effects of stray capacity.

One end of the secondary winding 186 of the transformer 178 is connected to a control grid 188 of a triode vacuum tube 192, and its other end is returned to ground through one-half of the secondary winding 194 of a transformer 196. The opposite end of winding 194 is connected through the secondary winding 198 of a transformer 202, similar to transformer 178, to a control grid 204 of a vacuum tube 206.

The transformer 202 couples into the commutator a second signal, derived from oscillator 46, which is to be compared in magnitude with the unbalance signal from bridge 34. One end of the primary winding 208 of the transformer 202 is connected to ground, and the other end is connected to the adjustable contact 212 of the motor-driven potentiometer 58. One end of potentiometer 58 is connected to the adjustable contact 214 of a potentiometer 216, and the opposite end of potentiometer 58 is connected to the adjustable contact 218 of a potentiometer 222. The potentiometers 216 and 222 are joined by a fixed resistor 224 and potentiometer 216 is connected through a fixed resistor 226 to lead 154 from the oscillator 46; the opposite end of potentiometer 222 is connected to ground through a fixed resistor 228. Thus, fixed resistor 226, potentiometer 216, fixed resistor 224, potentiometer 222, and fixed resistor 228 are connected in series to form a voltage divider for the oscillator output signal appearing on lead 154. Thus, movement of adjustable contact 212 of potentiometer 58 will vary the magnitude of the oscillator signal applied to the commutator 56, and contacts 214 and 218 of potentiometers 216 and 222 can be set manually to adjust the range over which the voltage may be varied by means of contact 212 of potentiometer 58.

A 400-cycle commutation voltage is provided by means of a lead 232 which is connected by a terminal 233 to a source of 400-cycle voltage within the power supply 122. The lead 232 is connected to one end of the primary winding 234 of the transformer 196, and the other end of winding 234 is connected to ground.

The 400-cycle commutation voltage, introduced through transformer 196, alternately renders tubes 192 and 206 conductive. When tube 192 is conducting, the plate current is modulated by the high frequency signal from bridge 34, which is coupled through transformer 178; when the polarity of the 400-cycle signal reverses to render tube 206 conductive, the high frequency signal from potentiometer 58, applied through the transformer 202, is superimposed on the 400-cycle wave form in the plate current of tube 206.

Anodes 236 and 238 of tubes 192 and 206, respectively, are connected together and, by a lead 242, to a positive terminal 243 of the power supply 122. The output signal from commutator circuit 56 is taken from the cathodes 244 and 246 of tubes 192 and 206, respectively, which are connected together and through a resistor 248 to the filter 62, the D.-C. ground return path for the cathodes 244 and 246 being provided through an inductance 252 in the filter circuit 62.

The filter 62 is a band-pass filter, centered at the frequency of the signal generated by the oscillator 46, in this example, ten kilocycles, the pass band of the filter being wide enough to pass the side-bands produced by the commutation voltage. In the present example, the filter 62 is arranged to pass frequencies between approximately 9,000 and 11,000 cycles. This filter comprises an input section formed by the inductance 252 connected in parallel with a condenser 254. This section is coupled through a condenser 257 to a second filter section comprising an inductance 258 connected in parallel with a condenser 262 and in parallel with a terminating resistor 264. One output terminal of this filter section is connected to ground through a resistor 266, connected in parallel with a condenser 268. The other output terminal of this filter section is connected to a control grid 270 of a triode detector tube 272. The resistor 266 and condenser 268 thus, are included in the grid-ground return circuit of detector tube 272 and provide a grid-leak bias for this tube so that the detector does not overload in the presence of large signals. The cathode 274 of the detector tube 272 is connected to ground through a low-resistance bias resistor 276. The anode 278 of this tube is by-passed to ground by a condenser 282, which offers a relatively low impedance to the 10 kilocycle portion of the signal, the time-constants of this and succeeding stages being chosen to eliminate the 10 kilocycle component of the signal and pass the 400-cycle envelope. The anode 278 is connected also through a plate-load resistor 284 and a lead 286 to a positive terminal 288 on a power supply 122A, which may be the same as 122, but which is shown separately here to simplify the circuit diagrams, and through a coupling condenser 292 to the control grid 294 of a triode amplifier tube 296, a ground return circuit for the grid 294 being provided through a resistor 298. The cathode 302 of this tube is returned to ground through a bias resistor 304, and its anode 306 is connected to the positive supply lead 286 through a plate-load resistor 308, the anode being by-passed to ground by a condenser 312, which offers a low impedance to the higher frequency components of the signal, but a relatively high impedance to the lower frequency components of the signal.

The signal appearing at anode 306 is coupled through a condenser 314 to the control grid 316 of a triode amplifier tube 318. In order to provide a convenient source of fixed bias for the grid 316, it is connected through an isolating resistor 322 to the grid 324 of a triode tube 326, which is utilized as a diode rectifier, its anode 327 being connected to ground. The cathode 328 is connected by a lead 329 to a tap 330 on the secondary winding 152 of the output transformer 142 of the oscillator-amplifier 46, so that a D.-C. bias voltage is developed across a load and filter circuit which comprises a resistor 321 and a condenser 332 connected in parallel between the grid 324 of tube 326 and ground.

The cathode 333 of amplifier tube 318 is connected directly to ground, its anode 334 is connected through a primary winding 335 of an interstage transformer 336 to a positive supply terminal 337 of the power supply 122A.

The 400-cycle signal which is thus applied to the primary winding 335 of the transformer 336 is connected, in phase opposition, to two output amplifier tubes 342 and 344, connected in push-pull relationship. The control grid 346 of the amplifier tube 342 is connected to one end of a secondary winding 348 of the transformer 336 and the opposite end of this winding is connected to the control grid 352 of the tube 344. The winding 348 is provided with a center tap connection which is connected to ground through a bias resistor 354 and a by-pass condenser 356. A condenser 358 is connected in parallel with winding 348 to by-pass high frequency components of the signal. Cathodes 362 and 364 of tubes 342 and 344, respectively, are connected together and to ground through a bias resistor 366.

Anodes 368 and 372 of tubes 342 and 344 are connected to opposite ends of a primary winding 374 of an output transformer 376, the center tap of winding 374 being connected through a lead 377 to a positive voltage supply terminal 378 of power supply 122A. A condenser 382 is connected between the anodes 368 and 372 as a further precaution against the presence of high frequency signals.

The 400-cycle signal delivered by tubes 342 and 344 will be in-phase with respect to the 400-cycle signal which provided the commutation voltage or will be 180° out-of-phase with respect to that voltage, depending on whether the unbalance voltage from the bridge 34 or the comparison voltage from potentiometer 58 is larger. The magnitude of this output signal will depend upon the extent of the difference between these signals, and when the system is in balance, no 400-cycle signal will be delivered by the tubes 342 and 344. The output signal is induced in the secondary winding 384 of the transformer 376, one end of which is connected to one end of an energizing winding 385 of the two-phase reversible motor 68, the opposite ends of transformer winding 384 and motor winding 385 being connected to ground. Another energizing winding 386 of the motor 68 is coupled through a phase shifting condenser 388 and a lead 392 to the same source of 400-cycle voltage, from power supply 122A that was fed to the commutator circuit 56. The field produced by winding 385 will lead or lag, by 90°, the field produced by the winding 386 depending upon whether the unbalance voltage from bridge 34 is greater or less than the comparison voltage from potentiometer 58. Accordingly, the armature 396 of motor 68 which is ganged to the adjustable contact 212 of potentiometer 58, will rotate in one direction or the other so as to alter the voltage delivered by potentiometer 58 in such direction that the system is brought into balance. The armature 396 is arranged also to control the counter-type indicator 2, so that its visible numbers are a function of the magnitude of the voltage delivered by potentiometer 58, and conveniently are calibrated in terms of the total amount of fuel in the fuel tanks 16 and 18 of the aircraft.

The present invention also has particular utility in the measurement of the total quantity of fuel in two or more tanks that are separated from each other by considerable distance or in two or more tanks of different depths and horizontal cross-sectional areas.

The calibrations of a measuring system such as that described in detail above depend upon the capacity of the fuel tank in which the condenser is positioned, that is, with a given fuel tank, each unit change in capacity of the condenser will represent a certain change in the quantity of fuel in the tank. However, if two condensers of the same dimensions are positioned, respectively, in tanks having different horizontal dimensions, the relationship between capacitance and fuel quantity will be different, that is, the same change in capacity of the condenser will represent a different change in fuel quantity. Thus, if two condensers of the same physical dimensions are used in tanks of different horizontal cross-sectional areas, the total capacity of the two condensers cannot be used as a measure of the total quantity of fuel in the two tanks.

It is possible to correct for the difference in tank dimensions by utilizing condensers having different cross-sectional dimensions, these dimensions being proportioned in accordance with the size of the particular tanks in which they are to be used. However, this procedure is not an ideal solution to the problem. The cost of manufacturing such specialized condensers would be high and the problem of replacement of the condenser units would be made more difficult.

In accordance with the embodiment of the invention illustrated in Figure 6, two condensers 14A and 14B of the same cross-sectional dimensions, that is, having the same capacity per unit of height, are utilized in the measurement of the total amount of fuel in two tanks, represented diagrammatically at 18A and 18B, of different heights and different cross-sectional areas, and which may be positioned a considerable distance from each other and from the auxiliary measuring apparatus.

The condensers 14A and 14B are connected, respectively, to bridge circuits 34A and 34B, similar to the one described in connection with the first embodiment, which are positioned adjacent to the respective measuring condensers. These bridges are energized from a common oscillator by means of cables 48A and 48B, respectively, and their unbalance signals are delivered to the commutator 56 by two cables, generally indicated at 54A and 54B.

In this embodiment, the two conductors 402 and 404 of the cable 54A are isolated from ground and are carried within a grounded outer shield, indicated diagrammatically at 406. The ends of conductors 402 and 404 are connected respectively, to opposite ends of a potentiometer 408 which is positioned adjacent to the commutator circuit 56.

The two conductors 412 and 414 of the cable 54B may be carried within an external grounded shield, as at 416, or, because the conductor 412 itself is grounded a single inner conductor may be used with the other connection being made through the common ground circuit, as in the earlier-described embodiment.

The conductors 412 and 414 from bridge 34B are connected to opposite ends of a potentiometer 418, the adjustable contact 422 of which is connected to one end of the potentiometer 408, the adjustable contact 424 of which is connected to one end of the primary winding 176 of the commutator input transformer 178.

The potentiometer connections are so made that the bridge unbalance voltages are combined with in-phase relationship so that their sum is applied to the commutator transformer winding 176.

By adjustment of the potentiometers 408 and 418, suitable correction is introduced for the differences in the sizes of the fuel tanks 18A and 18B, while permitting all of the measuring condensers to be fabricated from tubing of the same standard diameters.

These adjustments may be made as follows: Assume that tank 18B will hold 1000 pounds of fuel and that tank 18A will hold only 500 pounds of fuel. With tank 18B filled and tank 18A empty, the adjustable contact 424 is moved to the lower end of potentiometer 408, as viewed in Figure 6, that is, so that no voltage from bridge 34A is introduced into the commutator 56, and contact 422 of potentiometer 418 is adjusted until the counter-type indicator 2 (Figure 5) indicates 1000 pounds. The tank 18A is then filled and contact 424 of potentiometer 408 adjusted until the indicator 2 reads 1500 pounds.

The total change in the unbalance voltage introduced into the commutator circuit by bridge 34B will correspond to a change of 1000 pounds in fuel supply, and the total change in voltage introduced by bridge 34A will represent a change of 500 pounds in the fuel supply. With this arrangement, a unit change in voltage applied to the commutator circuit represents a fixed change in the quantity of the fuel supply irrespective of which bridge circuit produces the voltage change.

From the foregoing it will be observed that the measuring systems embodying my invention are well adapted to attain the ends and objects hereinbefore set forth and to be economically manufactured, since the separate elements are for the most part available from already-existing commercial production, and the separate features are subject to a variety of modifications as may be desirable in adapting the invention to different applications.

It is apparent that various modifications can be made in the overall system without departing from the scope of the invention as set forth in the following claims, and it is to be understood, therefore, that the above embodiments are presented in accordance with the requisite statutes for the purpose of teaching those skilled in the art how to employ the invention and adapt it to their own specific uses, without limiting the invention to the particular forms shown and described.

I claim:

1. In a system for measuring the total quantity of liquid in two remotely-positioned tanks, first and second condensers comprising spaced plates, each of said condensers being positioned in one of said tanks so as to permit the liquid in the tank to seek its level between said plates thereby causing their capacity to vary as a function of the amount of liquid in the tank, first and second normally unbalanced alternating current bridge circuits each including one of said condensers as one arm thereof, said bridge circuits each having energizing and output terminals and being positioned, respectively, adjacent said first and second condensers, a common high frequency oscillator connected to the energizing terminals of both of said bridge circuits, first and second adjustable voltage-dividing networks connected, respectively, to the output terminals of said bridge circuits, circuit means connecting at least a portion of said voltage-dividing networks in series so as to add the bridge unbalance voltages with in-phase relationship, and measuring apparatus positioned remotely from said tanks for measuring the voltage produced across said last-said circuit means.

2. Apparatus as claimed in claim 1 including first and second impedance transforming devices, and first and second relatively long low-impedance connecting cables, said first device and said first cable being connected between said output terminals of said first bridge circuit and said first voltage-dividing network, said second device and said second cable being connected between said output terminals of said second bridge circuit and said second voltage-dividing network.

3. Apparatus as claimed in claim 1 wherein said measuring apparatus includes a variable source of voltage derived from said oscillator, a low-frequency commutator connected to said source and to said circuit means for comparing the magnitude of the voltage from said source with that from said circuit means, and a reversible motor under the control of said commutator for equalizing said last-named voltages.

4. In a system for indicating the magntiude of a condition, the combination comprising a condenser responsive to changes in the magnitude of the condition being measured, a normally-unbalanced bridge circuit positioned adjacent to said condenser and including said condenser in one arm thereof, an oscillator, an adjustable voltage-divider circuit, means connecting said oscillator to energize said bridge circuit and said divider circuit, an apparatus for comparing the value of the unbalance voltage of said bridge circuit with a voltage delivered by said voltage-divider circuit including a commutator, means connecting said bridge circuit to said commutator so that said commutator will be controlled in part by said unbalance voltage, means connecting said voltage-divider circuit to said commutator so that the output of said voltage-divider circuit will act in part to control said commutator, circuit means included in said commutator for delivering an output signal of the frequency produced by said oscillator and having a magnitude which is alternately a function of the magnitude of said bridge unbalance voltage and a function of the magnitude of the output voltage from said voltage-divider circuit, and a reversible electric motor under control of the output signal of said commutator for adjusting said voltage-divider circuit in such direction that its output signal is made equal to said bridge unbalance voltage, the adjusted position of said voltage divider being an indication of the magnitude of said condition.

5. In a system for denoting at a remote position the magnitude of a condition, the combination comprising a condenser, the capacity of which is a predetermined function of the magnitude of the condition being measured, a bridge circuit positioned adjacent to said condenser and including said condenser in one arm thereof, and apparatus for measuring the unbalance voltage of said bridge circuit; said apparatus being positioned remotely from said bridge circuit and including an oscillator, a voltage-divider circuit, means connecting said oscillator to said bridge circuit and said divider circuit for energizing such circuits, a commutator, means connecting said bridge circuit to said commutator so that said commutator will be controlled in part by said unbalance voltage, means connecting said voltage-divider circuit to said commutator so that the output of said voltage-divider circuit will act in part to control said commutator, circuit means included in said commutator for delivering an output signal which is alternately a function of the magnitude of said bridge unbalance voltage and a function of the magnitude of the output voltage from said voltage-divider circuit, and a reversible electric motor under control of the output signal of said commutator for adjusting said voltage-divider circuit in such direction that its output signal is equal to said bridge unbalance voltage, the adjusted position of said voltage-divider circuit being an indication of the magnitude of said condition.

6. In a system for denoting at a remote position the magnitude of a condition, the combination comprising a condenser, the capacity of which is a predetermined function of the magnitude of the condition being measured, a bridge circuit positioned adjacent to said condenser and including said condenser in one arm thereof, and apparatus for measuring the unbalance voltage of said bridge circuit; said apparatus being positioned remotely from said bridge circuit and including a high frequency oscillator, a voltage-divider circuit, means connecting said oscillator to said bridge circuit and said divider circuit for energzing such circuits, a commutator suppled by a voltage of a frequency that is low relative to the frequency of the signal produced by said oscillator, means connecting said bridge circuit to said commutator so that said commutator will be controlled in part by said unbalance voltage, means connecting said voltage-divider circuit to said commutator so that the output voltage of said voltage-divider circuit will act in part to control said commutator, circuit means included in said commutator for delivering an output signal which includes a low frequency component alternately modulated by said bridge unbalance voltage and by the output voltage from said voltage-divider circuit, and a reversible electric motor under control of said output signal from said commutator for adjusting said voltage-divider circuit in such direction that its output signal is equal to said bridge unbalance voltage, the adjusted setting of said voltage-divider circuit being indicative of the magnitude of said condition.

7. A system in accordance with claim 6, wherein said voltage-divider circuit is manually adjustable for setting the limits over which said motor is capable of varying the output voltage thereof.

8. A system in accordance with claim 6, wherein said voltage-divider circuit is provided with a pair of independently manually adjustable taps, and further comprising an indicator mechanically driven by said motor, the adjustment of said taps serving to coordinate the values of the magnitude of said condition as indicated by said indicator with the output voltage of said voltage-divider circuit.

9. Apparatus for indicating the magnitude of a condition which is effective to vary the capacitance of a condenser, comprising a bridge circuit including said condenser in one arm thereof and having a step-down output transformer with a low impedance secondary winding, an oscillator connected to energize said bridge circuit, a commutator having a signal input transformer with a low impedance primary winding, a cable connecting said secondary winding to said primary winding for electrically introducing the unbalance voltage of said bridge circuit to said commutator, and adjustable voltage-divider circuit, means connecting said oscillator through said voltage-divider circuit to said commutator, circuit means included in said commutator for delivering an output signal which alternately is a function of the magnitude of said bridge unbalance voltage and of the magnitude of the output voltage delivered by said voltage-divider circuit, and a reversible electric motor under control of the output signal of said commutator to adjust said voltage-divider circuit in such direction that its output voltage is equal to said bridge unbalance voltage, the adjusted setting of said voltage-divider circuit being indicative of the magnitude of said condition.

10. Apparatus in accordance with claim 9, wherein said bridge circuit is positioned closely adjacent to the condition to be measured and remote from said commutator, a cable connecting the secondary winding of the bridge circuit output transformer with the primary winding of the commutator signal input transformer, the arrangement aforesaid being such as to minimize the effect on the indicated magnitude of said condition of the line capacitance of said cable.

11. Apparatus in accordance with claim 9, wherein said oscillator is positioned remote from said bridge circuit and is connected to said bridge circuit through a step-up transformer, which is located adjacent to said bridge circuit.

12. Apparatus for indicating the magnitude of a condition which is effective to vary the capacitance of a condenser, comprising an oscillator for supplying a potential of a predetermined high frequency, a bridge circuit positioned remotely from said oscillator and including said condenser in one arm thereof, a fixed condenser included in an adjacent arm of said bridge circuit, the remaining arms of said bridge circuit being formed of a split secondary of a step-up transformer, the primary of which is energized by said oscillator, an output circuit for said bridge circuit including an output transformer having a low impedance secondary winding, an adjustable voltage-divider circuit, means connecting said oscillator to energize said voltage-divider circuit, apparatus for comparing the output unbalance voltage of said bridge circuit with the voltage delivered by said voltage-divider circuit, including a commutator connected to a secondary winding of a commutator input transformer, said commutator input transformer having a low impedance primary winding connected in circuit with the low impedance secondary winding of said bridge circuit output transformer so that said commutator will be controlled in part by said unbalance voltage, means connecting said voltage-divider circuit to said commutator so that the output voltage of said voltage-divider circuit will act in part to control said commutator, circuit means included in said commutator for delivering an output signal of the frequency produced by said oscillator and having a magnitude which is alternately a function of the magnitude of said bridge unbalance voltage and a function of the magnitude of the output voltage from said voltage-divider circuit, and a reversible electric motor under control of the output signal of said commutator for adjusting said voltage-divider circuit in such direction that its output voltage is made equal to said bridge unbalance voltage, the adjusted position of said voltage-divider circuit being indicative of the magnitude of said condition.

13. A system for indicating the magnitude of a condition, wherein there is at least one condenser, at least one bridge circuit in which said condenser is connected, all the above-recited elements serving to convert the capacitances of all said condensers into a single unbalance voltage, the magnitude of which is a function of the magnitude of the condition to be indicated, an oscillator, an adjustable voltage-divider circuit, means connecting said oscillator to energize each said bridge circuit and said divider circuit, and apparatus for comparing the value of said unbalance voltage with the voltage delivered by said voltage-divider circuit including a commutator, means connecting said bridge circuit to said commutator, means connecting the output of said voltage-divider circuit to said commutator, circuit means included in said commutator and responsive to said unbalance voltage and to the output of said voltage-divider circuit to deliver an output signal of the frequency produced by said oscillator and having a magnitude which is alternately a function of the magnitude of said unbalance voltage and a function of the magnitude of the voltage from said voltage-divider circuit, and a reversible electric motor under control of the output signal of said commutator, said motor being arranged to adjust said voltage-divider circuit in such direction that its output signal is made equal to said unbalance voltage, so that the setting of said voltage divider may be taken as an indication of the magnitude of said condition.

14. An indicating system in accordance with claim 13, wherein said voltage-divider circuit includes a potentiometer having an adjusable tap, an indicator for visually indicating the magnitude of the condition, and wherein said motor is mechanically connected to said indicator and to said tap, so as simultaneously to control the indication of said indicator and to move said tap along said potentiometer.

15. An indicating system in accordance with claim 13, wherein there are two condensers responsive in their capacitances to the magnitudes of two conditions, the total of which is to be indicated, means electrically connecting said condensers in parallel, and wherein there is but one bridge circuit in which said parallel connected condensers are connected in one leg thereof.

16. An indicating system in accordance with claim 13, wherein there are a plurality of condensers responsive in their capacitances to the magnitude of a plurality of conditions respectively, the total of all of which is to be indicated, wherein there is one of said bridge circuits for each of said condensers respectively and wherein there are electrical means for combining the outputs of said bridge circuits and for supplying a potential which is a function of the total thereof to said commutator.

17. Apparatus for indicating the magnitude of a condition, comprising an oscillator for supplying a potential at a predetermined high frequency, means responsive to the magnitude of said condition and energized by said oscillator for supplying a first potential at said frequency having an amplitude which is a predetermined function of the magnitude of said condition, means energized by said oscillator for supplying a second potential at said frequency having an amplitude which is adjustably variable, a commutator energized by a third alternating potential having a frequency substantially different from the frequency of said oscillator, means electrically introducing said first potential into said commutator, means electrically introducing said second potential into said commutator, said commutator including vacuum tube elements having a common output circuit and controlled respectively by said first potential and by said second potential to provide an output signal having a wave form made up of said third potential, modified alternately by said first potential and by said second potential, balancing means responsilve to the relative amplitudes of said first and second potentials in said commutator output voltage for adjustably varying the amplitude of said second potential to bring it to an amplitude equal to that of said first potential, and means for indicating the magnitude of said condition as a direct function of the adjusted amplitude of said second potential.

18. Apparatus for indicating the magnitude of a condition, comprising an oscillator for supplying a potential at a predetermined high frequency, means responsive to the magnitude of said condition and energized by said oscillator for supplying a first potential at said frequency having an amplitude which is a predetermined function of the magnitude of said condition, means energized by said oscillator for supplying a second potential at said frequency having an amplitude which is adjustably variable, a commutator energized by a third alternating potential having a frequency substantially different from the frequency of said oscillator, means electrically introducing said first potential into said commutator, means electrically introducing said second potential into said commutator, said commutator including vacuum tube elements having a common output circuit and controlled respectively by said first variable potential and by said second potential to provide an output signal having a wave form made up of said third potential modified alternately by said first potential and by said second potential, means including a reversible electric motor controlled by said commutator output signal for operating said motor in a direction and to an extent determined by the relative amplitudes of said first and second potentials, means driven by said motor for adjustably varying said second potential to bring it to an amplitude equal to that of said first variable potential by the operation of said motor, and means for indicating the adjusted position of said adjustably variable means as indicative of the magnitude of said condition.

19. Apparatus according to claim 18, wherein said commutator includes a pair of vacuum tubes having a common cathode circuit acting as an output circuit, each of said tubes having a control grid, a transformer having its secondary winding connected to both said control grids and its primary winding energized by said third alternating potential for energizing said commutator with said third potential, a second transformer having its secondary winding connected to one of said control grids and its primary winding energized by said first potential for introducing said first potential into said commutator, a third transformer having its secondary winding connected to the other control grid and its primary winding energized by said second potential for introducing said second potential into said commutator, and means for supplying plate voltage to both said tubes.

20. Apparatus for indicating the total magnitude of a plurality of conditions, each of which is effective to vary the capacitance of a condenser respectively, and wherein there are different total variations in the capacitances of the respective condensers with the total possible variations of the respective conditions, comprising a plurality of bridge circuits each including one of said condensers in one arm thereof respectively, means for energizing each of said bridge circuits with a predetermined alternating current potential, and means for accumulating the output unbalance voltages of all said bridge circuits; said accumulating means comprising a plurality of potentiometers with their resistances connected across the output terminals of each of said bridge circuits respectively, means connecting the variable tap of each of said potentiometers other than the last of the plurality of potentiometers, to the low potential terminal of the next adjacent one of said potentiometers, the accumulated unbalance voltage appearing between the low potential terminal of the first of said potentiometers and the variable tap of the last of said potentiometers; and means responsive to the magnitude of said accumulated unbalance voltage for indicating the accumulated magnitude of all said conditions.

21. Apparatus according to claim 20, wherein said condensers are utilized for detecting the levels of liquid in a plurality of containers respectively, and wherein said containers have different cross-sectional areas, whereby said accumulated unbalance voltage may be indicative of the total amount of liquid in all said containers.

CARL G. SONTHEIMER.

References Cited in the file of this patent

UNITED STATES PATENTS

| Number | Name | Date |
|---|---|---|
| 2,357,023 | Reid et al. | Aug. 29, 1944 |
| 2,367,746 | Williams | Jan. 23, 1945 |
| 2,371,040 | Fisher | Mar. 6, 1945 |
| 2,398,341 | Wills | Apr. 9, 1946 |
| 2,470,069 | Davies | May 10, 1949 |
| 2,492,863 | Hays | Dec. 27, 1949 |
| 2,530,619 | Kliever | Nov. 21, 1950 |
| 2,540,807 | Berry | Feb. 6, 1951 |

FOREIGN PATENTS

| Number | Country | Date |
|---|---|---|
| 441,576 | Great Britain | Jan. 22, 1936 |